Dec. 14, 1926.  
F. O. FARWELL  
1,610,272  
MECHANICAL MOVEMENT  
Filed March 25, 1924   2 Sheets-Sheet 1
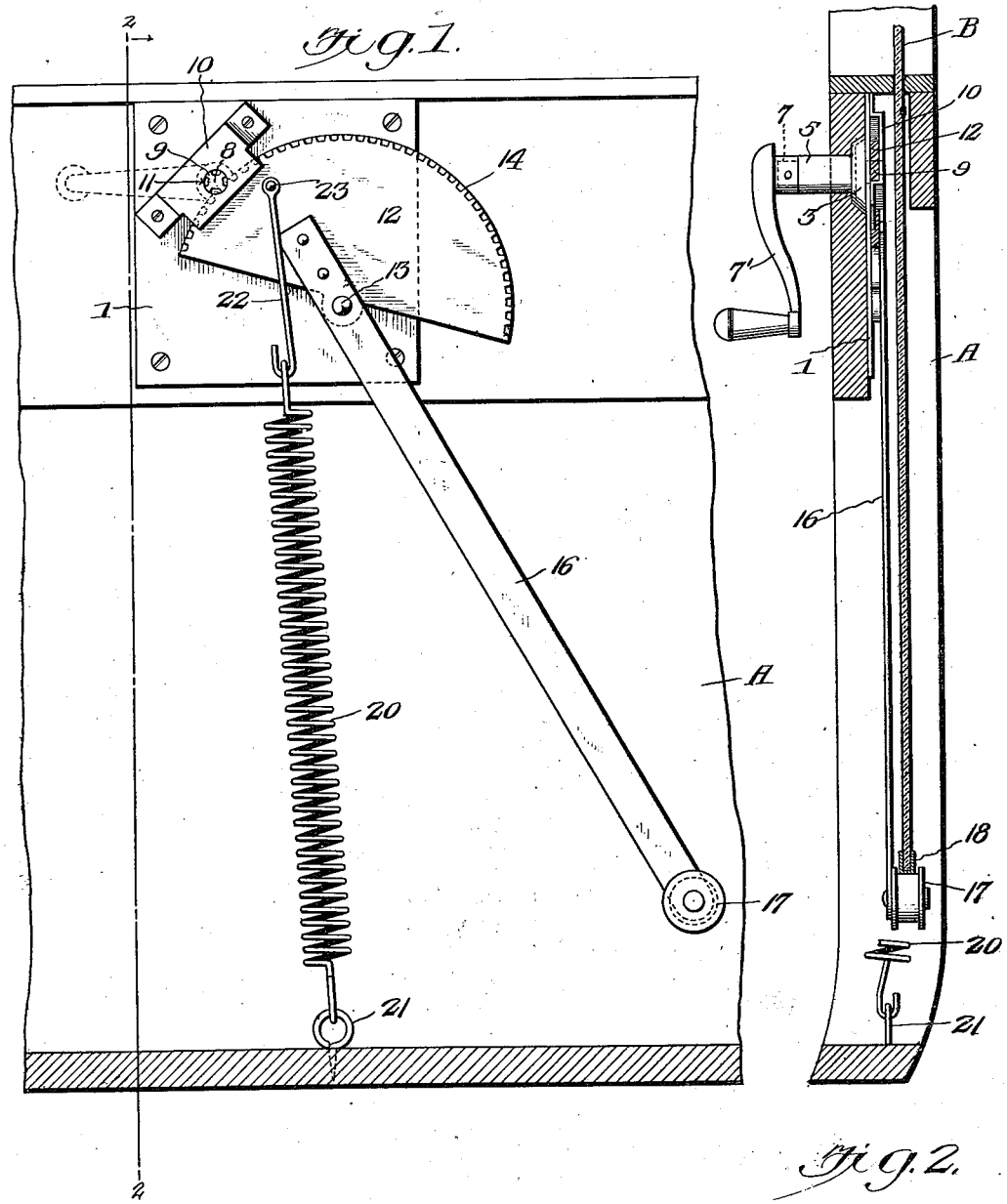

Dec. 14, 1926.
F. O. FARWELL
MECHANICAL MOVEMENT
Filed March 25, 1924
1,610,272
2 Sheets-Sheet 2
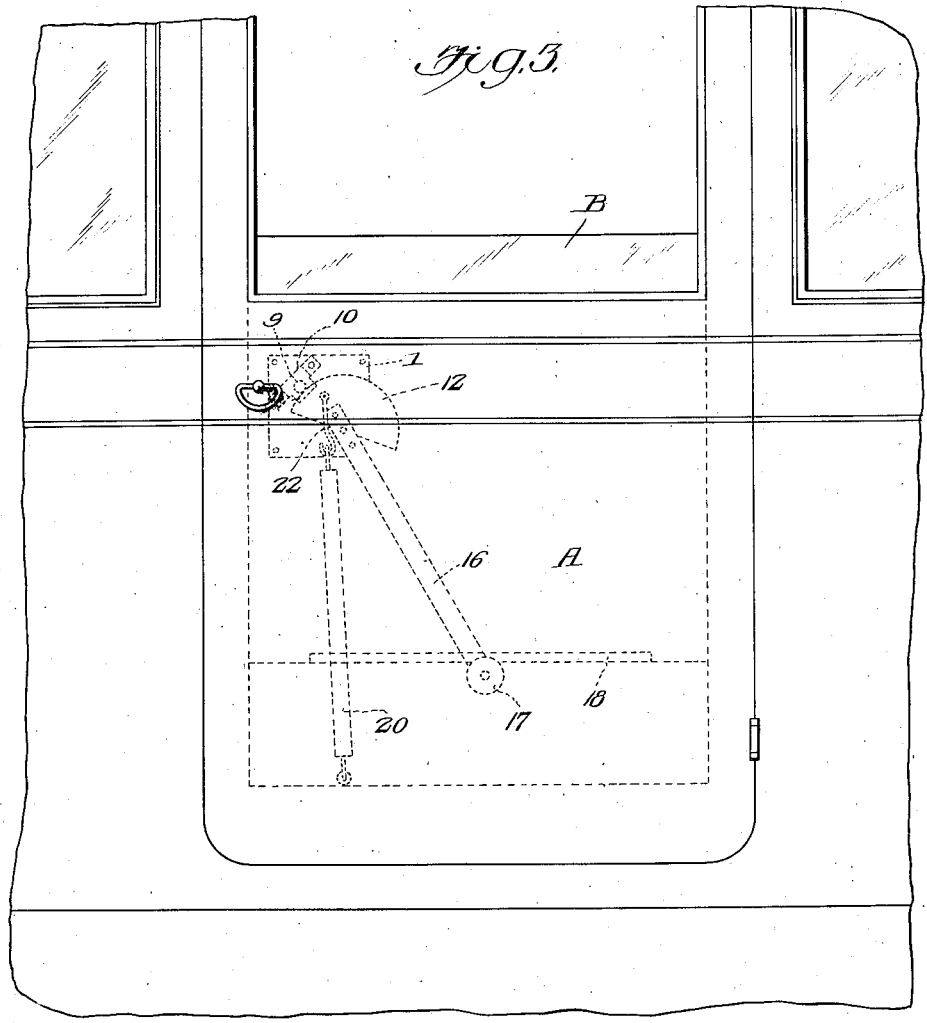
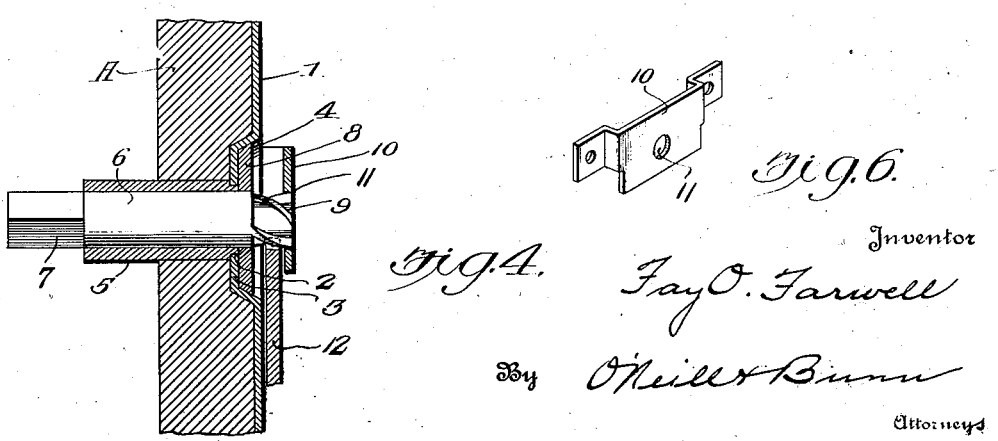
Inventor
Fay O. Farwell
By O'Neill & Bunn
Attorneys Patented Dec. 14, 1926.

1,610,272

UNITED STATES PATENT OFFICE.

FAY O. FARWELL, OF TOLEDO, OHIO, ASSIGNOR TO THE DURA COMPANY, OF TOLEDO, OHIO, A CORPORATION OF DELAWARE.

MECHANICAL MOVEMENT.

Application filed March 25, 1924. Serial No. 701,728.

The invention relates to a novel form of mechanical movement including a driving gear and a driven gear, mounted upon parallel axes and having intermeshing teeth, so disposed and arranged as to effect free rotation of both gear elements in both directions when actuating power is applied to the driving gear, and to produce an effective locking of both gears against rotary movement, when the actuating power is relieved and the reaction of the load on the driven gear tends to reverse the operation of the gears, the locking being effected by means of the movement of the driving gear in the direction of its axis of rotation, which movement forces a braking element associated with the driving gear into engagement with a fixed braking element.

The invention is illustrated in the accompanying drawings, in which:

Fig. 1 is a front elevation of the mechanical movement as applied to a window operating and locking device.

Fig. 2 is a sectional elevation on the line 2—2 of Fig. 1.

Fig. 3 is a fragmentary side elevation of an automobile body showing the invention applied to the window of the door thereof.

Fig. 4 is an enlarged fragmentary sectional elevation corresponding to the upper portion of Fig. 2.

Fig. 5 is a fragmentary plan view of the gears.

Fig. 6 is a perspective view of a braking attachment.

Referring to the drawings, 1 indicates a base plate, generally rectangular in shape, adapted to be secured to a suitable support by screws, rivets or similar holding devices, said plate being provided with a perforation 2 centrally disposed in a circular depression 3 provided with outwardly tapering or flaring sides 4, the depression in effect constituting the female member of a locking clutch or brake. A thimble 5 is secured in the opening 2 and constitutes a journal bearing for a rotary shaft 6, preferably provided on its outer end with a squared shank 7 to receive the socket of an operating handle 7'.

The opposite end of the shaft 6 is reduced and has formed on the peripheral surface thereof helically disposed gear teeth 9, the reduced end of the shaft carrying the gear teeth extending beyond the plate 1 as illustrated in Fig. 4.

Rigidly secured on the shaft 6 is a disk 8 having a bevelled or chamfered periphery, which disk cooperates with the depression 3 and the inclined sides thereof, to constitute the male member of a locking clutch or brake of the cone type, when said parts are brought into cooperative engagement.

Pivoted on a stud 13 mounted on the plate 1 is a gear member 12 having its peripheral edge provided with helical teeth 14 adapted to intermesh with the teeth 9 on the shaft 6. In the particular exemplification of the invention, the gear member 12 is preferably formed as a segment of a disk made of relatively thin metal which is capable of free rotation on the centering stud 13.

A U-shaped bracket 10, secured to the base plate 1, is provided with an opening 11 into which the gear end of shaft 6 projects, and also with an extended lip which overhangs the periphery of gear member 12 and prevents any material lateral distortion of the edge of said gear member due to the reaction between the helical teeth of said gear member and the teeth of the driving gear 9.

As thus constituted, the mechanism involves a helical driving gear 9, having relatively few teeth, meshing with a helical driven gear or pinion 12 of relatively large diameter and a correspondingly large number of teeth. When power is applied to the shaft 6 to rotate the same in one direction, as by means of the handle 7', the reaction between the helical teeth on the respective gear members tends to force said gear members away from each other in the direction of their respective axes. Rotation of the shaft 6 in the opposite direction produces an opposite reaction between the helical teeth of the respective gear members and tends to move both of said members toward each other in the direction of their respective longitudinal and parallel axes. Any material movement of the driven gear or pinion 12, in the direction of its axis of rotation, is prevented by the plate 1, on the one hand, and by the guard lip of the bracket 10 on the other. A limited movement of the shaft 6 and the gear 9 on the end thereof is possible, by reason of the space between the outer face of disk 8 and the adjacent face of gear member 12. It will be seen therefore that the rotation of the gear 6 in one direction disengages the clutch or brake member 8 from its mating member constituted by the depression 3 with its conical side walls 4 and permits the free rotation of the shaft and the consequent driving of the pinion 12 by the helical gear 9. The reverse rotation of the shaft 6 tends to move the said shaft in the direction of its longitudinal axis, due to the reaction between the teeth on the gear members, and therefore to cause the disk member 8 to engage its mating clutch or lock member. The frictional engagement between these elements of the clutch or brake, however, when power is applied to the shaft 6 to rotate the latter, is not sufficient to materially interfere with the free rotation of said shaft and the driving of the meshing gears. On the other hand, if the power applied to the handle to rotate said shaft is released, the reaction of the load carried by the pinion or driven gear 12, operating through the relatively long lever arm, represented by the radius of the driven gear, and operating through the intermeshed helical teeth of the gear members, will produce a component longitudinal thrust on the shaft 6 and thereby force the disk 8 of the locking clutch into engagement with the bottom and side walls of the stationary member of said locking clutch, the force exerted between the clutch members being proportional to the load, so that the greater the load the larger the force of frictional engagement between the interlocking clutch members.

It will be seen, therefore, that the mechanism as described and illustrated permits the intermeshed gears to be operated in either direction by power applied to the shaft 6 of the driving gear, the movement applied to the driven gear being utilized for any desired purpose; the mechanism, however, being automatically locked against movement, due to the reaction of the load operated upon by the driven gear, when the driving power is released.

By way of illustration, the invention is shown as applied, with certain accessories, for raising, lowering and locking windows, but it will be understood that the invention is not limited to such specific application, but is capable of a wide variety of uses wherever gearing is employed for effecting movement of a given part and for effectually resisting reverse movement of the part by the action of gravity or by other force applied to the moving part in a direction which would normally effect such reverse movement.

As applied to operating the window of an automobile or similar purpose, a lever arm 16 is secured to the gear member or pinion 12 by suitable fastening devices and, as shown, is engaged with the pintle 13 on which the gear member rotates. The lower end of the arm is provided with a grooved anti-friction roller 17 which is adapted to engage the lower edge of the glass B mounted for reciprocating movement in the framing of the door A of the body of an automobile or similar vehicle. In order to counterbalance the weight of the glass B, a helical spring 20 is secured by an eye 21 to the bottom of the door framing and is attached to the gear member 12 by a hook 22 pivotally secured at 23 to the gear member 12 between the center and the periphery of the gear member. Rotation of the handle 7' in one direction rotates the gear 12 in a direction to elevate the outer end of the lever 16 and with the latter, the glass B, the roller 17 on the lever engaging a channel-shaped strip 18 secured to the lower edge of the glass. When the handle is rotated in the opposite direction, the glass will be lowered. The raising and lowering operation may be effected to any desired extent to open or close the window wholly or partially and as soon as the rotatory force applied to the handle is released, the weight of the glass tends to swing the lever 16 downwardly. The tendency, however, is immediately resisted by the reaction between the helical teeth 14 of the gear member 12 and the helical teeth 9 on the driving shaft 6, which produces a longitudinal thrust on the shaft 6 in the direction of the axis of rotation thereof and forces the locking clutch member 8 into engagement with the bottom and side walls of the stationary brake member formed by the depression 3 and the tapering side walls thereof in the plate 1, thereby locking the drive shaft against rotation and holding the glass at any desired position of adjustment, and further movement of the glass in either direction being possible only by rotating the handle 7'.

What I claim is:

1. The combination with meshing helical driving and driven gears having different axes of rotation extending parallel to each other, and means operative through the reaction of the teeth of the gears to lock said gears against rotation when the driving power is released and the load on the driven gear tends to reverse the rotation of the gears.

2. The combination with meshing helical driving and driven gears having different axes of rotation extending parallel to each other, and means, including a break member secured to one of said gears and a cooperating fixed brake member, operative through the reaction of the teeth of the gears to lock said gears against rotation when the driving power is released and the load on the driven gear tends to reverse the rotation of gears.

3. The combination of meshing helical driving and driven gears having parallel axes of rotation, the driving gear being capable of limited movement longitudinally of its axis of rotation, a brake member secured to the driving gear, and a cooperating stationary brake member, said brake members being engaged to lock the gears by axial movement of the driving gear due to the reaction of the teeth of the gears when the driving power is released and the load on the driven gear tends to reverse the rotation of the gears.

4. The combination of an axially shiftable drive shaft having a helical gear thereon, a helical pinion meshing with said gear and having an axis of rotation parallel with that of said shaft and gear, a brake member fast on said shaft, and a stationary brake member cooperating therewith to lock the gears when the shaft is shifted axially by the reaction between the teeth of the pinion and the gear when the driving power is released and the load on the pinion tends to rotate the latter.

5. The combination of an axially shiftable drive shaft having a helical gear thereon, a helical pinion meshing with said gear and having an axis of rotation parallel with that of said shaft and gear, a brake disk fast to said shaft, and a stationary brake member surrounding the shaft and cooperating with the disk to lock the gears when the shaft is shifted axially by the reaction between the teeth of the pinion and the gear when the driving power is released and the load on the pinion tends to rotate the latter.

6. The combination of a support, an axially shiftable drive shaft journaled in said support and having a helical gear thereon, a helical pinion meshing with said gear and having an axis of rotation parallel with that of said shaft and gear, a brake member fast on said shaft, and a stationary brake member on said support, said brake members cooperating to lock the gears when the shaft is shifted axially by the reaction between the teeth of the pinion and the gear when the driving power is released and the load on the pinion tends to rotate the latter.

7. The combination of a support, an axially shiftable drive shaft journaled in said support and having a helical gear thereon, a helical pinion meshing with said gear and having an axis of rotation parallel with that of said shaft and gear, a brake disk having a conical periphery fast to said shaft, and a stationary braking element on said support having a complementary conical rim, said brake members cooperating to lock the gears when the shaft is shifted axially by the reaction between the teeth of the pinion and the gear when the driving power is released and the load on the pinion tends to rotate the latter.

8. The combination of a base plate having an opening therein, a bearing sleeve secured to said opening, an axially shiftable drive shaft journaled in said sleeve and extending through said opening, a helical gear on said shaft, a helical pinion meshing with said gear and having an axis of rotation parallel with that of said shaft and gear, a brake disk fast to said shaft, an annular socket in said base plate surrounding the opening and cooperating with the disk to lock the gearing when the shaft is shifted axially by the reaction between the teeth of the pinion and the gear when the driving power is released and the load on the pinion tends to rotate the latter.

9. The combination of a base plate having an opening therein, a bearing sleeve secured in said opening, an axially shiftable drive shaft journaled in said sleeve and extending through said opening, a helical gear on said shaft, a helical pinion meshing with said gear and having an axis of rotation parallel with that of said shaft and gear, a brake disk having a conical periphery on said shaft, an annular socket having a complementary conical rim in said base plate surrounding the opening and cooperating with the disk to lock the gearing when the shaft is shifted axially by the reaction between the teeth of the pinion and the gear when the driving power is released and the load on the pinion tends to rotate the latter.

10. The combination with meshing helical driving and driven gears having parallel axes of rotation, means operative through the reaction of the teeth of the gears to lock said gears against rotation when the driving power is released and the load on the driven gear tends to reverse the rotation of the gears, and a lever secured to and extending from said driven gear.

11. The combination with meshing helical driving and driven gears having parallel axes of rotation, means operative through the reaction of the teeth of the gears to lock said gears against rotation when the driving power is released and the load on the driven gear tends to reverse the rotation of the gears, a lever secured to and extending from said driven gear, and means attached to said driving gear to counterbalance a load supported by the free end of the lever.

12. The combination with meshing helical driving and driven gears having parallel axes of rotation, means operative through the reaction of the teeth of the gears to lock said gears against rotation when the driving power is released and the load on the driven gear tends to reverse the rotation of the gears, a lever secured to and extending from said driven gear, and a spring attached to the driven gear and to a fixed anchorage to counterbalance a load supported by the free end of the lever.

13. The combination of a support, an axially shiftable drive shaft journaled in said support and having a helical gear thereon, a helical pinion meshing with said gear and having an axis of rotation parallel with that of said shaft and gear, a brake member fast on said shaft, a stationary brake member on said support, said brake members cooperating to lock the gears when the shaft is shifted axially by the reaction between the teeth of the pinion and the gear when the driving power is released and the load on the pinion tends to rotate the latter, and a lever arm secured to and extending from said pinion.

14. The combination of a support, an axially shiftable drive shaft journaled in said support and having a helical gear thereon, a helical pinion meshing with said gear and having an axis of rotation parallel with that of said shaft and gear, a brake member fast on said shaft, a stationary brake member on said support, said brake members cooperating to lock the gears when the shaft is shifted axially by the reaction between the teeth of the pinion and the gear when the driving power is released and the load on the pinion tends to rotate the latter, a lever arm secured to and extending from said pinion, and means attached to said pinion to counterbalance a load supported by the free end of the lever.

15. The combination of a support, an axially shiftable drive shaft journaled in said support and having a helical gear thereon, a helical pinion meshing with said gear and having an axis of rotation parallel with that of said shaft and gear, a brake member fast on said shaft, a stationary brake member on said support, said brake members cooperating to lock the gears when the shaft is shifted axially by the reaction between the teeth of the pinion and the gear when the driving power is released and the load on the pinion tends to rotate the latter, a lever arm secured to and extending from said pinion, and a spring attached to the pinion and to a fixed anchorage to counterbalance a load supported by the free end of the lever.

16. A window operating device comprising a gear member, a lever fixed thereto and adapted to engage and raise the window when the gear is rotated in one direction, a driving gear meshing with said gear member, means for operating the driving gear, and automatic means for locking the gears when the operating power for the driving gear is released.

17. The combination with meshing driving and driven toothed members having different axes of rotation extending parallel to each other, of means operative through the reactive effort of the teeth of said members to lock the same against rotation when the driving power is released and the driven member tends to rotate the driving member.

18. The combination with meshing driving and driven toothed members having different axes of rotation extending parallel to each other, of means operative through the reactive effort of the teeth of said members to lock the same against rotaton when the driving power is released and the load on the driven member tends to rotate said members and a lever carrying the load and secured to said driven member.

19. The combination with driving and driven toothed members having different axes of rotation extending parallel to each other, of means operative through the reactive effort of the teeth of said members to lock the same against rotation when the driving power is released and the load on the driven member tends to reverse the rotation of said members, a lever carrying the load and secured to said driven member and means secured to one of said members for counterbalancing the load carried by said lever.

In testimony whereof I affix my signature.

FAY O. FARWELL.